United States Patent [19]

Shiina et al.

[11] 3,987,134
[45] Oct. 19, 1976

[54] MANUFACTURE OF FOAMED COMPARTMENTED STRUCTURES

[75] Inventors: Naonori Shiina, Tokyo; Kirokuro Hosoda, Yokohama, both of Japan

[73] Assignee: The Furukawa Electric Co., Ltd., Tokyo, Japan

[22] Filed: May 22, 1973

[21] Appl. No.: 362,825

[30] Foreign Application Priority Data

| May 25, 1972 | Japan | 47-52001 |
| July 31, 1972 | Japan | 47-76582 |
| Oct. 26, 1972 | Japan | 47-107349 |
| Oct. 31, 1972 | Japan | 47-109118 |
| Mar. 7, 1973 | Japan | 48-26071 |

[52] U.S. Cl. .............. 264/45.4; 264/45.8; 264/54; 264/DIG. 5; 264/DIG. 18; 428/315; 428/327
[51] Int. Cl.² ......................... B29D 27/00
[58] Field of Search .......... 264/45, 46, 47, DIG. 18, 264/45.4, 45.8; 260/2.5 B; 117/100 C

[56] References Cited
UNITED STATES PATENTS

| 2,363,051 | 11/1944 | Dosmann | 264/54 |
| 2,910,730 | 11/1959 | Risch | 264/45 |
| 2,964,799 | 12/1960 | Roggi et al. | 264/47 |
| 3,010,157 | 11/1961 | Cizek | 260/2.5 B |
| 3,270,393 | 9/1966 | Levenson | 264/47 |
| 3,341,480 | 9/1967 | Feild | 264/DIG. 18 |
| 3,359,130 | 12/1967 | Goldman | 117/100 C |
| 3,413,389 | 11/1968 | Footner | 264/46 |
| 3,428,579 | 2/1969 | Stahnecker | 117/100 C |
| 3,553,301 | 1/1971 | Reardon et al. | 264/46 |

FOREIGN PATENTS OR APPLICATIONS

| 1,084,746 | 9/1967 | United Kingdom | 264/321 |

*Primary Examiner*—Robert F. White
*Assistant Examiner*—James B. Lowe
*Attorney, Agent, or Firm*—Carroll Palmer

[57] ABSTRACT

A method of manufacturing foamed moldings having a compartment-structure therein, the average wall thickness of all compartments being at least 0.1 mm, which comprises heating an aggregate of foamable materials, each comprising a layer of plastics or rubber, capable of forming the said compartment wall whereby the foamed materials are bonded with one another at the layer thereof to form an integrated foamed molding.

12 Claims, 10 Drawing Figures

3,987,134

MANUFACTURE OF FOAMED COMPARTMENTED STRUCTURES

BACKGROUND OF THE INVENTION

This invention relates to a method of manufacturing mechanically strong foamed plastics or rubber moldings and to the products thereof.

In recent years, foamed articles of plastics or rubber have come to be used in increasing quantities in wide fields in view of various features thereof such as excellent heat insulating, shock and sound absorbing and cushioning properties, and a high buoyancy. Foamed articles used to date have been improved primarily in the heat insulating and cushioning properties and so on. Accordingly, foamed articles consisting of fine cells have been accepted all the more favorably. These cells had an average diameter of less than 0.5 mm and a wall thickness of several microns.

Quite recently, however, many attempts are made to apply foamed articles as structural material and consequently there arises growing demand for foamed product having great mechanical strength. To meet this demand, there is proposed the process of forming a layer of skin on foamed articles or enlarging individual cells with their walls more thickened. Though somewhat improved from the standpoint of providing structural material, the conventional process of incorporating a foaming agent in synthetic polymers and thermally expanding the mass can not fully attain the object, offering only limited applications.

SUMMARY OF THE INVENTION

It is accordingly the object of this invention to provide a method of manufacturing mechanically strong foamed plastics or rubber moldings with the prominent properties of the foamed mass maintained. Namely, this invention consists in manufacturing foamed plastics or rubber moldings having a compartment structure, the average wall thickness of compartments being at least 0.1 mm.

The foamed moldings obtained by the method of this invention have particularly thick-walled compartments, and present great mechanical strength despite their light weight and prominent impermeability to water. In addition, the present foamed molding display excellent heat insulating and shock absorbing properties and high chemical resistance and can be used as large articles of complicated shapes bearing great industrial importance such as structural, packaging and floating materials.

DETAILED DESCRIPTION OF THE INVENTION

This invention relates to a method of manufacturing foamed moldings having a compartment structure in cross section, the average wall thickness of all compartments being at least 0.1 mm. This type of foamed product could not be manufactured by the conventional process of mixing synthetic polymers with a foaming agent and thermally expanding the mass. A method of this invention consists of heating an aggregate of foamable materials of plastics or rubber, each mass having a layer capable of forming a compartment at least 0.1 mm in wall thickness.

In the present invention the above-mentioned aggregate of the foamable materials exist as a collective state wherein each foamable material is contacted with adjacent others. Therefore the aggregate is collective state which is formed by feeding an amount of the foamable materials, for example, into a confinable mold or a space defined by plates or metal screens.

Figure 2:
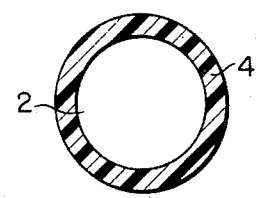
FIG. 2 indicates a cross sectional view of another type of a closed, spherical hollow foamable material of plastics or rubber containing a foaming agent therein.

The foamable materials are usually used as pellets, beads, divided pieces or the like, though not limited thereto. Each foamable material has an above-mentioned layer, and in one case it consists of only the layer itself as shown in FIG. 2. In any case, the foamable materials to be used in the present invention have heat expansible properties.

Figure 1:
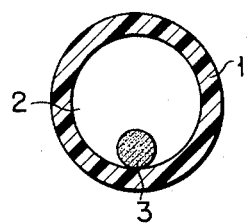
FIG. 1 shows a cross sectional view of a closed, spherical, hollow foamable material of plastics or rubber containing a foaming agent in its hollow portion.
Figure 5:
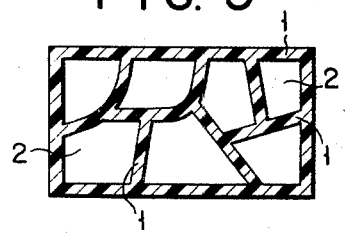
FIGS. 5 to 8 indicate the internal structural patterns of foamed moldings manufactured by the method of the invention.

A first embodiment of this invention comprises heating an aggregate of closed, spherical, hollow foamable materials, each consisting, as shown in FIG. 1, of plastics or rubber portion 1 circular in cross section, a closed hollow area 2 and a foaming agent 3, such as gas or gas-evolving material, received in a hollow area 2, and finally expanding the hollow foamable materials into an integrated foamed molding having such a compartment structure in cross section as shown in FIG. 5.

Figure 6:
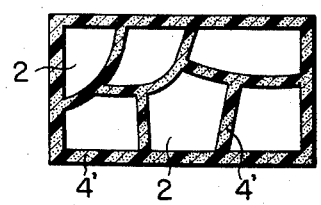

A second embodiment of the invention comprises heating an aggregate of a closed, spherical, hollow foamable materials each consisting, as shown in FIG. 2, of plastics or rubber portion 4 containing a foaming agent and presenting a circular cross section and a closed hollow area 2, and expanding the hollow materials into an integrated foamed molding having such a compartment structure as shown in FIG. 6.

Figure 3:
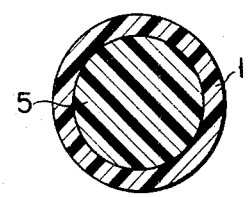
FIG. 3 shows a cross sectional view of still another type of a spherical foamable material comprising a core of plastics or rubber containing a foaming agent and an outer layer of plastics or rubber containing no foaming agent.
Figure 7:
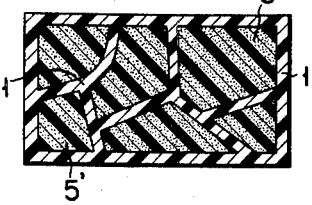

A third embodiment of the invention is thermally to expand an aggregate of solid foamable materials each comprising, as shown in FIG. 3, a core of plastics or rubber 5 containing a foaming agent and an outer layer of plastics or rubber 1 of the same or different kind containing no foaming agent to form an integrated foamed molding having such a compartment structure as shown in FIG. 7.

Figure 4A:
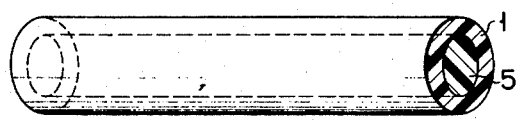
FIGS. 4A to 4C show perspective views of said materials in rod-like, sandwiched and tubular forms respectively.
Figure 4B:
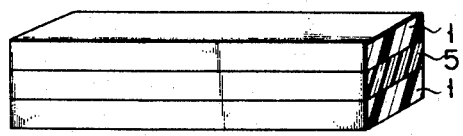
Figure 4C:
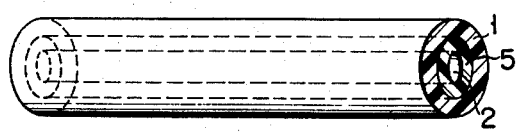

A fourth embodiment of the invention is thermally to expand an aggregate of foamable materials each prepared, as shown in FIGS. 4A to 4C, by joining plastics or rubber 5 containing a foaming agent with the same or different plastics or rubber 1 containing no foaming agent, thereby forming the foamable materials into an integrated foamed molding having such a compartment structure as shown in FIG. 7.

Figure 8:
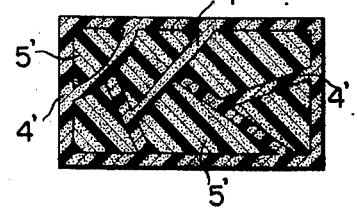

FIG. 8 shows a modified embodiment of the foamed molding shown in FIG. 7, produced from foamable materials of FIGS. 3 and 4 except that a small amount of foaming agent is contained in the layer which is to form a compartment.

When heat is applied, the above-mentioned foamable materials fully packed in mold are expanded by a foaming agent contained therein to bond with one another and fill up spaces therebetween, producing an integrated foamed molding conforming in a shape to the inner outline of the mold. In this case, the compartments of said foamed molding have an average wall thickness of at least 0.1 mm.

According to this invention, foamable materials are intended to build compartments when expanded during molding. The foamable materials are expanded to a small degree, saving the requirement of an expensive foaming agent. Since the foamable materials contain a foaming agent surrounded by thick walls of plastics or rubber, gases evolving from the foaming agent are little likely to escape. Since in the present invention substantially unfoamable plastics or rubber constitutes thick-walled compartments, the moldings obtained are free from change with time in respect of shape and size and preserve the aforementioned excellent properties.

Foamable materials used in this invention are generally spheric or cubic. For the object of this invention, however, the foamable materials may additionally take a round or angular columnar shape, or a spiral or any other forms. Where foamable materials are elongate, they can be mutually entwined to provide a mechanically foamed product.

The foamed moldings obtained by this invention are characterized in that the compartments have an average wall thickness of at least 0.1 mm. To this end, the compartment-forming layer is chosen to have also a thickness of at least 0.1 mm. Otherwise, the mechanically strong foamed moldings of this invention would be difficult to manufacture. Said compartment-forming layer should preferably have a thickness of 0.3 mm to 10 mm or more preferably 0.5 mm to 5 mm.

Though varying with the shape and size of foamable materials, the type of a foaming agent and the foaming process, yet the density of a foamed molding obtained by the method of this invention is generally of the order of 0.5 to 0.05 g/cc or preferably 0.3 to 0.1 g/cc. Further before subjected to expansion, the foaming materials are generally chosen to have a diameter of 5 to 50 mm.

Foamable materials according to the first embodiment of this invention having, as shown in FIG. 1, a foaming agent in a closed, spherical, hollow area can be prepared, for example, by blow molding. Further, said foamable materials can be produced by extruding plastics or rubber into a tube using a cross head type wire extruder and cutting the tube into small pieces and, before sealing both ends of these cut pieces of the tube at the outlet of a die, inserting a foaming agent or a mixture of a foaming agent and wax or plastics into the hollow area of the cut pieces.

The foamable material shown in FIG. 2 may be prepared by not only blow molding the raw material but also extruding it through an extruder into a tube, cutting it into small pieces having a desired length and sealing both open ends of the cut pieces by compressing or twisting them while a slight pressure is applied to the hollow portion.

The foamable material illustrated in FIG. 3 may be formed, for example, by immersing foamable plastics to form a core in unfoamable polyvinyl chloride paste and gelatinizing the coated paste after taking it out of the paste. It is also possible to extrude foamable raw material into a rod, coat it with unfoamable raw material and seal it by compression or twisting.

The foamable materials indicated in FIG. 4 may be prepared by substantially the same process. According to the embodiments shown in FIGS. 4A to 4C, however, part of the core material containing a foaming agent is exposed to the outside. To restrict as much as possible the escape of gases evolving from a foaming agent, therefore, the foamable material is used in an elongate form or with both ends sealed by compression. If the core materials having a foaming agent shown in FIGS. 4A and 4C are subjected to a great stress during extrusion so as to present shrinkage upon heating and the unfoamable surrounding layer is made of a less shrinkable material, then the prominent shrinkage of the core material during thermal foaming causes both ends of the foamable material to be sealed, thereby considerably restricting the escape of gases evolved from the foaming agent.

Foamed moldings manufactured by the method of this invention have such structural patterns in cross section as presented in FIGS. 5 to 8. The same numerals given therein denote the same constituent members as those of FIGS. 1 to 4C. FIG. 5 represents the structural pattern of foamed moldings prepared from the foamable material of FIG. 1, where closed, spherical hollow foamable materials of plastics or rubber are joined together. FIG. 6 shows the structural pattern of foamed moldings prepared from the foamable materials of FIG. 2, where the plastics or rubber 1 of FIG. 5 was replaced by a foamed plastics or rubber 4'. Though not subject to any particular limitation, the degree of expansion of said foamed plastics or rubber is generally preferred to be less than three times its original size so as to allow the cells to maintain a spherical form. FIG. 7 indicates the structural pattern of foamed moldings obtained from the foamable materials of FIGS. 3 and 4A to 4C, where the compartments are not hollow as in FIGS. 5 and 6, but are filled with expanded plastics or rubber 5', thereby improving the heat insulating property of the foamed moldings. FIG. 8 presents the structural pattern of foamed moldings where the walls of compartments 4' are foamed plastics or rubber in place of an unfoamed plastics or rubber 1 of FIG. 7. The foamed walls 4' are expanded to an extent of less than three times the original volume as in case of FIG. 6.

This invention can manufacture foamed moldings having both hollow and filled compartments by using a mixture of the foamable materials of FIGS. 1 and 3.

For the object of the invention, it is preferred that foamable materials be expanded in more than one direction during molding in a mold. For example, if the foamable material placed at the bottom of the mold is mainly expanded in the direction of the height of the mold, then there will result a foamed product having a directional nature, which will sometimes be deformed with time. According to this invention, therefore, the foamable materials shown in, for example, FIG. 3 are sometimes heated under gas pressure and then cooled similarly under gas pressure for preliminary foaming so as to render the foamable materials capable of final expansion, though somewhat suppressed in the initial expansion by application of such pressure. The preexpanded materials filling a mold are subjected to final expansion so as to be joined together into an integrated foamed molding free from a directional nature. Otherwise, a mixture of the foamable material of FIG. 3 and, for example, finely cut up pieces of plastics pipe having a low bulk density may be fed into a mold to the capacity to produce foamed moldings. It is also possible to roll up or bundle together thin elongated rods of foamable materials as shown in FIGS. 4A and 4C so as to match the shape of a mold, followed by thermal foaming. When fully filled in a mold and foamed to a desired degree with the content of a foaming agent properly controlled, then the foamable materials of FIGS. 1 and 2 provide foamed moldings free from a directional nature.

The foaming materials of this invention should preferably be expanded to the same extent in three dimensional directions. To this end, the raw plastics or rubber may be mixed with a cross-linking agent in addition to a foaming agent or cross linked by irradiating ionizing radiation insofar as the fluidity of plastics or rubber is not much obstructed. This process permits the uniform expansion of foamable materials and not only prevents the foamed product from being deformed but also enables it to have excellent resistance to heat and solvent. Most preferable is a foamed product manufactured from foamable materials whose core consists of polyolefins previously mixed with a cross-linking agent as well as a foaming agent, because the product has great heat stability. Further, the compartment-forming layer of the foamable material may sometimes be cross linked by using a cross-linking agent or irradiating ionizing radiation. If said layer is cross linked insofar as its fluidity is not much obstructed, then it will provide foamed moldings prominently resistant to heat and solvent.

The method of this invention can also manufacture foamed moldings consisting of an aggregate of foamed constituents having different densities by mixing two or more of foamable materials capable of being expanded in varying degrees. Such composite foamed molding has a merit of being available for use as the cushioning material of packages over a broad range of load. It is also possible to manufacture a beautiful multicolor foamed product from a mixture of more than two kinds of foamable materials prepared by adding different pigments to raw plastics or rubber containing a foaming agent.

In the use of the foamable materials shown in FIGS. 3 and 4A to 4C, the raw material containing a foaming agent and the same or different raw material containing no foaming agent need not be fully joined, because their firm joining is effected by the pressure of foaming to which they are later subjected.

The method of this invention can manufacture foamed moldings of uniform density and great mechanical strength even from plastic wastes. Such wastes generally consist of aggregates of different types of plastics and further sometimes contain foreign matter such as wood or metal chips or sand. Therefore, products manufactured solely from plastic waste would be liable to crack. However, the method of the present invention permits the use of even such plastic wastes. They can be satisfactorily used as a compartment-forming material because compartments in a large number extend in multi-directions in a polyhedric form which functions to disperse any force given from outside, making up for any minor local fragility in the compartments which may result from the presence of foreign matter in plastic wastes.

In case plastic wastes are used as a material to form a core, even when expansion in any particular compartment is restricted by the presence of foreign matter, it is made up for by increased expansion in the adjacent compartments, thereby making the resultant foamed molding to take a desired shape.

Any thermoplastic plastics may be used in the method of this invention, including polyolefins such as polyethylene, polypropylene, polybutene-1, polybutene-2, and polymethylpentene-1; ethylene copolymers such as ethylene vinyl acetate copolymer, ethylene-butene copolymer and ethylene-ethyl acrylate copolymer, propylene copolymers such as propyleneethylene copolymer; vinyl chloride; vinyl chloride copolymers; polystyrene; styrene copolymers; acrylic resins; ABS resins; and polyamides. The above-listed plastics need not always be used alone but may be used in combination.

The rubbers used in the method of the invention include natural rubber, polybutadiene, polyisoprene, butadienestyrene rubber, butyl rubber, polychloroprene and ethylenepropylene rubber. It is also possible to use a mixture of rubber and plastics compatible therewith or mix waste rubber with the foaming materials of this invention.

The aforesaid plastics may contain stabilizers such as paraffin, stearic acid and metal stearates; fillers such as calcium carbonate, silicate, carbon black, and glass fiber; ultraviolet absorbers such as 2-hydroxy 4-methoxy benzophenone; antioxidants such as 2, 6-di-t-butyl hydroxy-toluene; plasticizers such as dioctyl phthalate; flame retardants such as antimony oxide and chlorinated paraffin; or coloring agents such as pigment. The aforesaid rubbers may be incorporated with various kinds of ordinary additives miscible with rubber such as a vulcanizing agent and a vulcanization accelerator.

The foaming agents used in the method of the invention may consist of organic types such as azodicarbonamide, dinitrosopentamethylene tetramine, p.p'-oxybisbenzenesulfonyl hydrazide and p-toluenesulfonyl semicarbazide. For the object of the invention, however, there are selectively used such foaming agents as have a decomposition temperature higher than the softening point of raw plastics materials. The foaming agents may further include inorganic types such as sodium bicarbonate and ammonium carbonate; and volatile types such as petroleum ether and dichlorodifluoromethane. It is also possible to use the above-mentioned types of foaming agent in combination.

The cross-linking agents used in the method of the invention include organic peroxides such as dicumyl peroxide, and azides such as 1, 10-decan bis sulfon azide and m-phenylene diazide. Further, there may sometimes be used plastics cross linked by ionizing radiation. Where a cross-linking agent is added to foamable materials, the foaming agent contained therein should have a higher thermal decomposition temperature than the cross-linking agent. If a foaming agent decomposes itself through an exothermic reaction, it will offer the advantage of shortening heating time required for foaming.

For the object of this invention, thermal expansion of numerous foamable materials is generally carried out under the condition where they are gathered in a metal mold. In this case, the mold may or may not be of airtight construction. Small metal molds are often of such a simple type as is formed of aluminium castings and large metal molds are those built of steel plates. It is possible thermally to expand foamable materials, for example, in a furnace having a conveyor belt inside, without using any mold, while the materials are being compressed into a predetermined shape, thereby manufacturing foamed moldings.

Since heating for expansion should preferably be applied at a low level of temperature, generally 100° to 300°C, for a short time, the heating is customarily carried out with steam. If, in this case, steam is directly introduced into a perforated metal mold fully packed with foamable materials, then heating time will be considerably reduced. Heating may be effected by other means, for example, hot air, infrared heater, hot oil bath or salt bath. Expansion of foamable materials is sometimes carried out by evacuating a metal mold while it is being heated.

The smooth finish of the surface of foamed moldings is sometimes attained by spreading powdered plastics over the surface of foamable materials before they are subjected to expansion.

Foamed moldings obtained by the method of this invention have such structural patterns as are illustrated in FIGS. 5 to 8, and are characterized in that the compartments are at least 0.1 mm in wall thickness, providing great mechanical strength. Generally, the larger the hollow portion of compartments and the thicker the walls thereof, then the greater the compressive strength and bending strength of foamed moldings.

Thick walls of the compartments reduce the hygroscopicity of foamed moldings. Therefore, the foamed product of this invention is further characterized in that the compartments therein have thick walls and expand only to a small degree so that it has little volumetric contraction with time or under heat, and particularly adapted for use as permanent or semipermanent structural material or buoys.

Foamed moldings having structural patterns shown in FIGS. 5 and 6 are often used as structural material or buoys, while those having structural patterns indicated in FIGS. 7 and 8 are applied as heat insulating material. The foaming of compartment walls themselves is generally carried out to an extent of not more than three times the original volume thereof. However, the method of this invention is not limited to this process.

Foamed moldings according to this invention are sometimes reinforced by metal screen, lath boards or steel plates. Such reinforcement imparts greater mechanical strength to the foamed product.

When foamed moldings having the structural pattern of FIG. 5 are prepared from natural or synthetic rubber, they can be used as a very strong and elastic cushioning material. This invention enables any kind of rubber to be readily formed into a foamed product whose density can be freely chosen, thus offering great convenience.

This invention will be more fully understood by reference to the examples which follow. Throughout the examples "parts" means parts by weight.

EXAMPLE 1

A mixture of 100 parts of high density polyethylene having a melt index of 1.5 (hereinafter the melt index is abbreviated as M.I.) and 2 parts of dicumyl peroxide was initially formed by an extruder into a tube 7 mm in inner diameter having a wall thickness of 1.5 mm. The tube was cut up into small pellets each 15 mm long. A small amount of sodium bicarbonate was placed in the hollow portion of the pellet and thereafter the pellet was sealed at both ends by heating. An aggregate of a large number of these hollow pellets containing said sodium bicarbonate had an overall bulk density of 0.25 g/cc.

The pellets were charged into a perforated metal mold 200 mm × 200 mm × 25 mm provided with a valve. After the mold was tightly closed, heating was applied for 20 minutes at a temperature of 190°C. Then, the mold was evacuated through the valve to 100 mmHg to permit the expansion of the pellets. A fabricated article taken out of the mold after its cooling indicated a shape substantially conforming to the inner outline of the mold, had compartments whose average wall thickness was 2.4 mm and a density of 0.25 g/cc, and presented prominent mechanical strength, impermeability to water and heat resistance.

EXAMPLE 2

Soft polyvinyl chloride was extruded into a tube 7 mm in inner diameter having a wall thickness of 1.5 mm. The tube was cut up into small pellets each about 10 mm long. A bead of foaming styrene about 5 mm in diameter was placed in the hollow portion of the pellet and thereafter the pellet was sealed at both ends by heating. A large number of these pellets collectively weighing 200 g were charged into a perforated metal mold 200 mm × 200 mm × 50 mm. The pellets were heated for 10 minutes for expansion, using steam pressure of 3 kg/cm$^2$. The resultant composite foamed molding consisting of soft polyvinyl chloride and polystyrene presented a shape conforming to the inner outline of the mold, had compartments whose average wall thickness was 1.8 mm and a density of 0.1 g/cc, displayed great compressive strength and little permanent set and was self-extinguishable.

EXAMPLE 3

A composition consisting of 100 parts of natural rubber, 4 parts of stearic acid, 3 parts of zinc oxide and 3 parts of tetramethylthiuramdisulfide was extruded into a tube 20 mm in inner diameter and 25 mm in outer diameter. Thereafter the pipe was cut up into small pellets each 50 mm long. 2 g of an equivalent mixture of dinitrosopentamethylene tetramine and ureal foaming activator was placed in the hollow portion of each pellet. Both ends of the pellets were tightly sealed. A large number of the pellets were fed in a perforated metal mold 500 mm × 500 mm × 500 mm and heated for 30 minutes with 135°C steam. A fabricated article taken out of the mold after its cooling presented a shape conforming to the inner outline of the mold, had compartments whose average wall thickness was 4.0 mm, was light and displayed excellent mechanical and shock-absorbing properties.

EXAMPLE 4

The raw composition of Example 3 was mixed with waste vulcanized rubber in the ratio of 1:1. The mass was thermally expanded in the same manner as in Example 3. A foamed molding obtained presented prominent hardness and shock absorbency.

EXAMPLE 5

A uniform mixture of 100 parts of low density polyethylene having a density of 0.92 and M.I. of 1.0, 3 parts of azodicarbonamide as a foaming agent and 0.5 part of dicumyl peroxide as a cross-linking agent was extruded at a lower temperature than the decomposition temperature of the foaming agent into a tube 10 mm in inner diameter having a wall thickness of 1 mm.

The tube was cut up into small hollow pellets each 30 mm long which had both ends sealed by heat and pressure. A large number of these pellets were charged a perforated metal mold 500 mm × 500 mm × 25 mm. The pellets were heated for 10 minutes for expansion with 180°C steam so as to be joined into an integrated mass. A foamed molding obtained had compartments whose average wall thickness was 3.0 mm and a density of 0.25 g/cc and displayed prominent compressive strength of 8.1 kg/cm$^2$, when compressed to 25% of the original thickness, mechanical strength and shock absorbency. When measured by way of comparison, an ordinary, commercially available foamed article of cross-linked polyethylene having a density of 0.25 g/cc indicated a compressive strength of as small as 4.3 kg/cm$^2$.

EXAMPLE 6

A mixture of 100 parts of polystyrene of general purpose type, 2 parts of azodicarbonamide as a foaming agent and 2 parts of ureal foaming activator was extruded into the same type of tube as in Example 5. The tube was cut up into small pellets. A large number of these pellets were fed in the same type of a metal mold and heated for 10 minutes for expansion with 140°C steam. A foamed product obtained had compartments whose average wall thickness was 2.4 mm and a density of 0.27 g/cc and presented very great mechanical strength.

EXAMPLE 7

A uniform mixture of 100 parts of ethylene-vinyl acetate copolymer containing about 25% of vinyl acetate, 8 parts of azodicarbonamide and 0.8 part of dicumyl peroxide was extruded into a tube 9 mm in inner diameter and 10 mm in outer diameter. The tube was cut up and sealed at both ends into small closed hollow pellets each 40 mm long. A large number of these pellets were charged into a shallow rectangular dish-like metal mold 300 mm × 300 mm × 25 mm which could be closed but was not airtight. The pellets were heated for 20 minutes for expansion with 200°C steam. A foamed molding obtained had compartments whose average wall thickness was 0.8 mm and a density of 0.12 g/cc, and indicated very prominent elasticity and mechanical strength.

EXAMPLE 8

A mixture of 50 parts of low density polyethylene having M.I. of 1 to 2, 50 parts of high density polyethylene having M.I. of 4, 10 parts of azodicarbonamide and 0.8 part of dicumyl peroxide was rolled into a sheet 3 mm thick. Separately, two sheets each 1 mm thick were prepared from the same type of low density polyethylene. The first mentioned sheet was held between said low density sheets. All the sheets were thermally pressed together in a sandwiched form. The resultant sheet was cut up into small cubes each side of which measured 5 mm. A large number of these cubes collectively weighing 50 g were fed in a steel mold 220 mm × 50 mm × 25 mm and heated for 20 minutes for expansion with steam compressed at a pressure of about 12 kg/cm$^2$. A composite foamed product obtained, had substantially closed compartments whose average wall thickness was 0.6 mm and displayed prominent compressive strength and other mechanical properties.

EXAMPLE 9

A mixture of 100 parts of low density polyethylene having M.I. of 1 to 2, 10 parts of azodicarbonamide and 1 part of dicumyl peroxide was mixed and extruded into a rod 3 mm in diameter at a temperature of 130°C without decomposing the foaming agent and cross linking agent. The rod was covered with high density polyethylene (M.I. = 7) extruded at a temperature of 170°C in a thickness of 2 mm. A composite rod obtained was cut up into small pellets each 30 mm long. When heated, the low density polyethylene constituting the core of the pellet far more contracted than the outer layer of high density polyethylene. A large number of these pellets weighing 60 g in total were placed in an aluminum mold 100 mm × 100 mm × 25 mm and heated for 10 minutes for expansion with 180°C steam. A foamed product obtained had a density of 0.25 g/cc and had its outer wall formed of unfoamed high density polyethylene. The individual compartments constituting the inner structure of the foamed product were covered with an outer layer of said unfoamed high density polyethylene and had an average wall thickness of 1.6 mm. Therefore, this foamed product had very great mechanical strength, little permeability to water and, particularly, large compressive strength.

EXAMPLE 10

A composition mainly consisting of the same type of low density polyethylene as used in Example 9 was extruded into a tube 3 mm in inner diameter and 5 mm in outer diameter in the same manner as in Example 9. The tube concentrically covered with soft polyvinyl chloride extruded at a temperature of 180°C in a thickness of 2 mm was cut up into small pellets each 10 mm long. A large number of these pellets weighing 300 g in total were placed in a steel mold 100 mm × 100 mm × 100 mm which could be closed but was not airtight, and heated for 3 minutes for expansion with 197°C (15 kg/cm$^2$) steam. A foamed product obtained had a density of 0.3 g/cc, was covered with a layer of soft polyvinyl chloride, proved self-extinguishable as a whole and had compartments whose average wall thickness was 1.8 mm. Therefore, the foamed product displayed very prominent cushioning property and mechanical strength.

EXAMPLE 11

100 parts of low density polyethylene (M.I. = 1 to 2), 10 parts of azodicarbonamide and 1 part of dicumyl peroxide were mixed and extruded into a rod 6 mm in diameter at a temperature of 130°C. The rod was covered with 2 mm thick layer formed by extruding the same above-mentioned mixture without containing the foaming agent of azodicarbonamide, thereby fabricating a composite rod 10 mm in outer diameter. This composite rod was cut up into a large number of small pellets, each about 20 mm long by an electrically heated nichrome wire. A large number of these small pellets jointly weighing 75g were fed in a perforated aluminium mold 100 mm × 100 mm × 25 mm, and heated for 5 minutes for expansion in a vessel filled with compressed 180°C steam. A foamed product obtained had a density of 0.3 g/cc and was covered with an unfoamed polyethylene layer. The individual compartments had an average wall thickness of about 2 mm. Therefore, the foamed product displayed very great mechanical strength, impermeability to water and large compressive strength. When heated for 4 hours at a temperature of 100°C, it indicated very little thermal distortion.

EXAMPLE 12

A mixture of 100 parts of waste plastics of low-density polyethylene, 15 parts of azodicarbonamide and 0.2 part of dicumyl peroxide was formed into a tube 6 mm in inner diameter and 1 mm in thickness. The tube was covered in a thickness of 1.5 mm with various waste plastics including polyethylene, polypropylene, polystyrene and polyvinyl chloride and mainly consisting of polyethylene and polypropylene. The tube was thermally cut up into small pellets each closed at both ends. A large number of these pellets were placed in a perforated metal mold having an inner capacity of 500 mm × 500 mm × 25 mm and heated for 10 minutes for expansion with 12 kg/cm$^2$ steam. A foamed product obtained presented a smooth surface, displayed prominent heat insulation, mechanical properties and impermeability to water and had a density of 0.12 g/cc, the compartments therein having an average wall thickness of 0.8 mm.

EXAMPLE 13

A large number of the same type of pellets used in Example 12 were gathered in a hot air furnace provided with a conveyor and heated for expansion. Toward the end of expansion, the foamed mass was compressed into a plate-like foamed product 50 mm thick. This product had foamed pellets well joined, presented a substantially smooth surface, displayed good heat insulating and mechanical properties, and had compartments whose average thickness was 0.8 mm.

EXAMPLE 14

A mixture of 100 parts of waste low density polyethylene, 8 parts of azodicarbonamide and 1 part of dicumyl peroxide was extruded into a rod 6 mm in diameter at a temperature of 135°C. The rod was covered with the same waste polyethylene in a thickness of 1 mm. The rod was cut up into small pellets each 20 mm long (pellet A). On the other hand, the same waste low-density polyethylene was extruded into a tube 7 mm in inner diameter and 0.5 mm in thickness. The tube was cut up into small pellets each 20 mm long (pellet B). These A and B pellets were mixed in the ratio of 1:4. The mixture was charged into a perforated metal mold 500 mm × 500 mm × 25 mm and heated for 10 minutes for expansion with 200°C steam. A foamed molding obtained had a density of 0.24 g/cc, compartments whose average wall thickness was 6 mm and displayed great mechanical strength.

EXAMPLE 15

The pellet A of Example 14 was placed in an autoclave containing suds and stirred while being immersed in the suds. With nitrogen gas introduced into the autoclave at a pressure of 10 atm., the pellet A was heated for 20 minutes for expansion at a temperature of 200°C, and thereafter cooled with the pressure reduced to 3 atm. A foamed product obtained had the foamed plastics substantially covered with unfoamed plastics and had an apparent density of 0.13 g/cc. The mass thus preliminarily expanded was charged into a perforated metal mold 500 mm × 500 mm × 25 mm and heated for 10 minutes for final expansion at a temperature of 130°C. A foamed product presented a shape conforming to the inner outline of the mold, had compartments whose average wall thickness was 0.4 mm and displayed very great mechanical strength.

EXAMPLE 16

The rod-like material as extruded in Example 14 was rolled up without being cut into small pellets. 400 g of the rolled material was placed in a perforated metal mold 300 mm × 300 mm × 50 mm in a shape conforming to the inner outline of the mold and heated for 10 minutes for expansion, using 10 kg/cm$^2$ steam. A foamed product obtained had a density of 0.09 g/cc and compartments whose average wall thickness was 0.5 mm. The product displayed great mechanical strength, heat insulation and heat resistance and was substantially free from deformation with time.

What we claim is:

1. A method for the manufacture of foamed moldings comprising a compartmented structure formed of a multiplicity of compartments of random shape joined together in a three-dimensional array, each compartment being defined by a solid wall the average thickness of which is at least 0.1mm., each compartment being substantially completely filled with foamed polyethylene which comprises:

providing an aggregate of foamable materials, each comprising a layer of thermoplastic material having a thickness of at least 0.1mm. capable of forming compartment walls of said structure enclosing a core of unfoamed polyethylene having a diameter of between about 5 to 50mm. containing a foaming agent and a cross-linking agent, and heating said aggregate in a mold to cause foaming of said polyethylene cores and to bond said materials with one another at said layer thereof into an integrated three-dimensional array of foam-filled compartments.

2. The method of claim 1 wherein each layer contains a cross-linking agent.

3. The method of claim 1 wherein said thermoplastic material is selected from the group consisting of homopolymers and copolymers of ethylene, propylene, styrene and vinyl chloride.

4. The method of claim 1 wherein said aggregate is heated in said mold with steam.

5. The method of claim 1 wherein said heating is at a temperature between about 100° and 300°C.

6. A method for the manufacture of foamed moldings comprising a compartmented structure formed of a multiplicity of compartments of random shape joined together in a three-dimensional array, each compartment being defined by a solid wall the average thickness of which is at least 0.1mm., each compartment being substantially completely filled with foamed polyethylene which comprises:

providing an aggregate of foamable materials each comprising a layer of thermoplastic material having a thickness of at least 0.1mm. capable of forming compartment walls of said structure and, surrounded with said layer, a cylinder of unfoamed polyethylene having a diameter of between about 5 to 50mm. containing foaming agent having a decomposition temperature higher than the softening point of said polyethylene and a cross-linking agent having a decomposition temperature lower than that of said foaming agent, and heating said aggregate in a mold to cause foaming of said polyethylene and to bond said materials with one another at said layer thereof to form an integrated three-dimensional array of foam-filled compartments.

7. The method of claim 6 wherein said layer of thermoplastic material has a thickness of about 0.3 to 10mm.

8. The method of claim 6 wherein said layer of thermoplastic material has a thickness of 0.5 to 5mm.

9. The method of claim 6 wherein each compartment wall consists of foamed thermoplastic material which is expanded to not more than three times the original unexpanded volume thereof.

10. The method of claim 6 wherein each compartment wall consists of unexpanded thermoplastic material.

11. The method of claim 6 wherein said thermoplastic material is selected from the group consisting of homopolymers and copolymers of ethylene, propylene, styrene and vinyl chloride.

12. A method for the manufacture of foamed moldings comprising a compartmented structure formed of a multiplicity of compartments of randon shape joined together in a three-dimensional array, each compartment being defined by a solid wall the average thickness of which is at least 0.1mm., each compartment being substantially completely filled with foamed polyethylene which comprises:

providing an aggregate of foamable materials, each comprising a layer of thermoplastic material having a thickness of at least 0.1mm. capable of forming compartment walls of said structure enclosing a core of unfoamed polyethylene having a diameter of between about 5 to 50 mm. containing a foaming agent and a cross-linking agent, and heating and expanding said aggregate in a furnace having a conveyor belt therein while being compressed into a desired shape thereby bonding materials in said aggregate into an integrated three-dimensional array of foam-filled compartments.

* * * * *